US010882947B2

(12) United States Patent
Elgimiabi

(10) Patent No.: US 10,882,947 B2
(45) Date of Patent: Jan. 5, 2021

(54) RAPID CURING EPOXY ADHESIVE COMPOSITIONS

(71) Applicant: 3M INNOVATIVE PROPERTIES COMPANY, St. Paul, MN (US)

(72) Inventor: Sohaib Elgimiabi, Dusseldorf (DE)

(73) Assignee: 3M Innovative Properties Company, St. Paul, MN (US)

( * ) Notice: Subject to any disclaimer, the term of this patent is extended or adjusted under 35 U.S.C. 154(b) by 56 days.

(21) Appl. No.: 15/301,126

(22) PCT Filed: Jun. 17, 2015

(86) PCT No.: PCT/US2015/036189
§ 371 (c)(1),
(2) Date: Sep. 30, 2016

(87) PCT Pub. No.: WO2015/195775
PCT Pub. Date: Dec. 23, 2015

(65) Prior Publication Data
US 2017/0088664 A1    Mar. 30, 2017

(30) Foreign Application Priority Data

Jun. 17, 2014 (EP) .................................. 14172755

(51) Int. Cl.
*C08G 59/50* (2006.01)
*C08G 59/68* (2006.01)
*C08K 7/28* (2006.01)

(52) U.S. Cl.
CPC ....... *C08G 59/5026* (2013.01); *C08G 59/687* (2013.01); *C08K 7/28* (2013.01)

(58) Field of Classification Search
CPC ................................................. C08G 59/5026
See application file for complete search history.

(56) References Cited

U.S. PATENT DOCUMENTS

| 3,271,498 | A | | 9/1966 | Rohe | |
| 3,282,015 | A | | 11/1966 | Rohe | |
| 4,101,459 | A | | 7/1978 | Andrews | |
| 4,668,736 | A | * | 5/1987 | Robins | C08G 59/68 525/65 |
| 4,778,851 | A | | 10/1988 | Henton | |
| 4,941,785 | A | | 7/1990 | Witten | |
| 2007/0293603 | A1 | * | 12/2007 | Shepherd | C08G 59/44 523/467 |
| 2009/0131556 | A1 | | 5/2009 | Honda | |
| 2010/0152373 | A1 | * | 6/2010 | Wakabayashi | C08G 65/337 524/588 |
| 2011/0237723 | A1 | * | 9/2011 | Yano | C09J 175/08 524/141 |
| 2011/0313082 | A1 | * | 12/2011 | Popp | C08G 59/50 523/443 |
| 2014/0100347 | A1 | * | 4/2014 | Cook | C08K 3/01 528/15 |
| 2014/0179828 | A1 | * | 6/2014 | Hefner, Jr. | C08G 59/50 523/400 |
| 2014/0374032 | A1 | * | 12/2014 | Heucher | C09J 177/00 156/752 |

FOREIGN PATENT DOCUMENTS

| EP | 2 223 966 | 9/2010 |
| WO | WO 2010/117669 | 10/2010 |
| WO | WO 2012/021258 | 2/2012 |

* cited by examiner

*Primary Examiner* — Megan McCulley
(74) *Attorney, Agent, or Firm* — Philip P. Soo

(57) ABSTRACT

The present disclosure is directed to a curable composition comprising: a) an epoxy resin; b) an epoxy curing agent comprising at least one cycloaliphatic amine; c) at least 3 wt % of a metal triflate catalyst; d) optionally, a fatty acid polyamide; and e) optionally, a filler material. The compositions of the present disclosure are particularly suitable for use in structural assembly, in particular for potting and filling operations in sandwich structures. The present disclosure also relates to a composite assembly and to methods of using such epoxy resin based curable compositions.

14 Claims, No Drawings

RAPID CURING EPOXY ADHESIVE COMPOSITIONS

Cross Reference to Related Applications

This application is a national stage filing under 35 U.S.C. 371 of PCT/US2015/036189, filed 17 Jun. 2015, which claims the benefit of EP Patent Application No. 14172755.2, filed 17 Jun. 2014, the disclosures of which are incorporated by reference in their entirety herein.

TECHNICAL FIELD

The present disclosure relates generally to epoxy resin based curable compositions, more specifically to the field of epoxy resin based curable adhesive compositions. The compositions of the present disclosure are particularly suitable for use in structural assembly, in particular for potting and filling operations in sandwich structures. The present disclosure also relates to a composite assembly and to methods of using such epoxy resin based curable compositions.

BACKGROUND

Structural adhesives are adhesive compositions that can bond materials with a mechanical strength comparable to mechanical fasteners. They may be used to replace or augment conventional joining techniques such as welding, brazing or mechanical fasteners, such as nuts and bolts, screws and rivets. In particular, in the transportation and construction industries, structural adhesives can present a light weight support of or even an alternative to mechanical fasteners.

Epoxy resin based compositions have been long known for their good adhesive and mechanical properties and have been widely used as bonding agents in a variety of applications. Many of these compositions contain latent curatives (for example dicyandiamides, anhydrides or aromatic amines, such as for example diaminodiphenyl sulfone) and require high temperatures for curing the adhesive composition. Such adhesive systems are referred to as "one-component systems". Other epoxy adhesive formulations with more reactive curing agents can be cured at lower temperatures. Such systems are referred to as "two-component systems", because at least the majority of the epoxy resins are kept separated from the curing agents to avoid premature cross-linking The two parts are combined upon application of the adhesive to initiate the curing reaction.

Sandwich structure panels, in particular the so-called "honeycomb panels" are frequently used for bulkheads, storage compartment flooring and other applications within the interior of aircrafts. Other applications for honeycomb panels are: aircraft flight control surfaces; transportable military shelters; various ground support equipment; and electronics cabinetry. Honeycomb panels are typically preferred because of their high strength to weight ratio and since they can be easily constructed to meet configurations required in the aircraft interior. One problem in connection with the use of honeycomb panels is that of attaching devices to them. Since the inner core of a honeycomb panel is generally composed of a cellular material with a great amount of open air spaces, a screw or bolt threaded into an opening in a panel does not obtain much pullout resistance. For this reason, a standard technique for providing means for attachment of a threaded member, such as a bolt to a honeycomb panel, has employed the use of various types of inserts. Examples of inserts used in honeycomb panels are described e.g. in U.S. Pat. No. 3,271,498 (Rohe et al.) and U.S. Pat. No. 3,282,015 (Rohe et al.).

As described e.g. in U.S. Pat. No. 4,941,785 (Witten), epoxy adhesives are typically used in combination with the inserts, so as to securely mount the insert elements within the panel once the epoxy adhesive has hardened. Generally, the bond strength of a structural epoxy adhesive continues to build well after the composition has been appropriately applied, requiring sometimes hours or even days for the adhesive composition to reach its ultimate strength. Accordingly, in the adhesive industry in general, and in particular for structural assembly applications within aircraft interiors, a strong demand exists for fast curing products which typically allow increased production rate and faster bonding operations.

In the aerospace interiors industry, polyurethane based compositions are typically used for insert potting operations in interior panels due to their high curing rates. However, with continuous developments and increasingly stringent regulatory requirements, these known polyurethane based compositions have become unsuitable due to their poor flame retardant characteristics and due to their toxicological classification.

Without contesting the technical advantages associated with the polyurethane based adhesive compositions known in the art, there is still a strong need for rapid curing epoxy resin based curable compositions suitable for use in structural assembly applications, and which can advantageously replace the known compositions.

Other advantages of the structural adhesives and methods of the invention will be apparent from the following description.

SUMMARY

According to one aspect, the present disclosure relates to a curable composition comprising:
  a) an epoxy resin;
  b) an epoxy curing agent comprising at least one cycloaliphatic amine;
  c) at least 3 wt % of a metal triflate catalyst;
  d) optionally, a fatty acid polyamide; and
  e) optionally, a filler material.

In another aspect, the present disclosure relates to a composite assembly comprising a sandwich structure provided with voids, wherein at least part the voids are filled with a curable composition as described above.

According to still another aspect of the present disclosure, it is provided a method of filling voids in a sandwich structure, comprising the steps of:
  a) providing a curable composition as described above;
  b) filling at least part of the voids comprised in the sandwich structure with the curable composition; and
  c) allowing the curable composition to cure.

In still another aspect, the present disclosure relates to the use of a curable composition as described above for industrial applications, in particular for manufacturing and repairing operations in construction, automotive, aeronautics or aerospace industries. In yet another aspect, the present disclosure relates to the use of a curable structural adhesive composition as described above, for potting an insert in a sandwich structure, in particular a honeycomb structure.

DETAILED DESCRIPTION

Before any embodiments of this disclosure are explained in detail, it is to be understood that the disclosure is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. Contrary to the use of "consisting", the use of "including," "containing", "comprising," or "having" and variations thereof is meant to encompass the items listed thereafter and equivalents thereof as well as additional items. The use of "a" or "an" is meant to encompass "one or more". Any numerical range recited herein is intended to include all values from the lower value to the upper value of that range. For example, a concentration range of from 1% to 50% is intended to be an abbreviation and to expressly disclose the values between the 1% and 50%, such as, for example, 2%, 40%, 10%, 30%, 1.5%, 3.9% and so forth.

According to a first aspect, the present disclosure relates to a curable composition comprising:
a) an epoxy resin;
b) an epoxy curing agent comprising at least one cycloaliphatic amine;
c) at least 3 wt % of a metal triflate catalyst;
d) optionally, a fatty acid polyamide; and
e) optionally, a filler material.

In the context of the present disclosure, it has surprisingly been found that a curable composition as described above provides fast curing at room temperature while preserving excellent extrudability characteristics, which makes it outstandingly suitable for use in structural assembly applications, in particular for potting and filling operations in sandwich structures, in particular honeycomb structures.

It has in particular been found that the specific and unique combination of an epoxy curing agent comprising at least one cycloaliphatic amine and a metal triflate catalyst (as curing accelerator) in an amount of at least 3 wt % by weight of the curable composition, allows achieving fast curing, typically a curing rate corresponding to a time to reach Shore D≥50 of less than 90 min, preferably less than 60 min, when measured at 23° C. according to the test method described in the experimental section, while preserving excellent extrudability properties, typically an extrusion rate of at least 20 g/min, when measured at 23° C. according to the test method described in the experimental section.

Without wishing to be bound by theory, it is believed that the low viscosity characteristics provided by the cycloaliphatic amine curing agent allow using a high amount of metal triflate curing catalyst so that the required high curing rate can be achieved while still maintaining excellent extrudability characteristics of the curable composition. The commonly known approach to accelerate curing of epoxy resin based compositions comprising amine based curing agents, consists in using a combination of calcium nitrate and tertiary amines as curing accelerators. This known accelerator system has been found not to be appropriate for use in structural assembly applications, in particular for potting and filling operations in sandwich structures, for the reason that using high levels of calcium nitrate will lead to reaching inappropriately high level of viscosity which would detrimentally affect the extrudability characteristics of the resulting curable composition to such an extent that in some executions the resulting curable composition would become non-extrudable.

The structural adhesives compositions according to the disclosure may find particular use in structural assembly applications, in particular for potting and filling operations in sandwich structures, in particular honeycomb structures. Moreover, the curable compositions of the present disclosure may additionally find suitable use in other industrial applications, in particular for manufacturing and repairing operations in construction, automotive, aeronautics or aerospace industries.

The structural adhesive compositions according to the disclosure are a lightweight and safer alternative to conventional polyurethane based compositions that are typically used for insert potting operations in interior panels and which are unsuitable to meet acceptable flame retardant and toxicological requirements.

In the context of the present disclosure, the terms "solid" or "liquid" refer to ambient conditions (23° C., 101 kPa).

The curable composition according to the disclosure comprises an epoxy resin. Epoxy resins are polymers having one or more epoxy-functionality. Typically but not exclusively, the polymers contain repeating units derived from monomers having an epoxy-functionality but epoxy resins can also include, for example, silicone-based polymers that contain epoxy groups or organic polymer particles coated with or modified with epoxy groups or particles coated with, dispersed in, or modified with epoxy-groups-containing polymers. The epoxy-functionalities allow the resin to undertake cross-linking reactions. The epoxy resins may have an average epoxy-functionality of at least 1, greater than one, or of at least 2.

Any epoxy resins well known to those skilled in the art may be used in the context of the present disclosure. Epoxy resins may be aromatic, aliphatic, cycloaliphatic or mixtures thereof. In a typical aspect, the epoxy resins for use herein are aromatic. Preferably, the epoxy resins contain moieties of the glycidyl or polyglycidyl ether type. Such moieties may be obtained, for example, by the reaction of a hydroxyl functionality (for example but not limited to dihydric or polyhydric phenols or aliphatic alcohols including polyols) with an epichlorohydrin-functionality. As referred to herein, dihydric phenols are phenols containing at least two hydroxy groups bonded to the aromatic ring (also referred to as "aromatic" hydroxy groups) of a phenol—or in case of polyphenols at least two hydroxy groups are bonded to an aromatic ring. This means the hydroxyl groups can be bonded to the same ring of the polyphenol or to different rings each of the polyphenol. Therefore, the term "dihydric phenols" is not limited to phenols or polyphenols containing two "aromatic" hydroxy groups but also encompasses polyhydric phenols, i.e. compounds having more than two "aromatic" hydroxy groups.

Examples of useful dihydric phenols include resorcinol, catechol, hydroquinone, and polyphenols including p,p'-dihydroxydibenzyl, p,p'-dihydroxyphenylsulfone, p,p'-dihydroxybenzophenone, 2,2'-dihydroxyphenyl sulfone, p,p'-dihydroxybenzophenone, 2,2-dihydroxy-1,1-dinaphrhylmethane, and the 2,2', 2,3', 2,4', 3,3', 3,4', and 4,4' isomers of dihydroxydiphenylmethane, dihydroxydiphenyldimethylmethane, dihydroxydiphenylethyl methylmethane, dihydroxydiphenylmethylpropylmethane, dihydroxydiphenylethylphenyl-methane, dihydroxydiphenylpropylenphenylmethane, dihydroxydiphenylbutylphenyl-methane, dihydroxydiphenyltolylethane, dihydroxydiphenyltolylmethylmethane, dihydroxydiphenyldicyclohexylmethane, and dihydroxydiphenylcyclohexane.

Preferred epoxy resins include epoxy resins containing or consisting of glycidyl ethers or polyglycidyl ethers of dihydric or polyhydric phenols, such as for example, but not limited to bisphenol A, bisphenol F and combinations thereof. They contain one or more repeating units derived from bisphenol A and/or F. Such ethers, or such repeating units are obtainable, for example, by a polymerization of glycidyl ethers of bisphenol A and/or F with epichlorohydrin. Epoxy resins of the type of diglycidyl ether of bisphenol A can be represented by formula (II) wherein n denotes the repeating unit (in case of n=0 formula (II) represents the diglycidyl ether of bisphenol A):

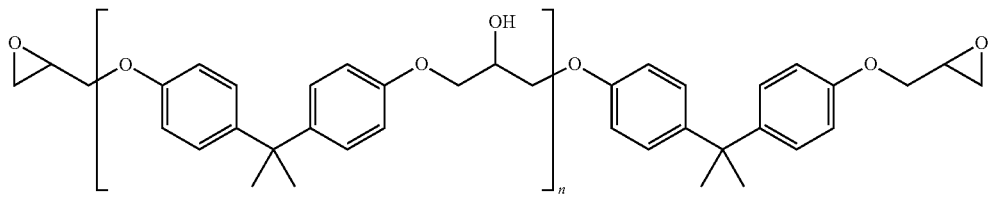

Typically, the epoxy resins are blends of several resins. Accordingly, n in formula (II) may represent an average value of the blend, and may not be an integer but may include values like, for example and not limited thereto, 0.1 to 2.5.

Instead of, or in addition to, using the aromatic epoxy resins described above also their fully or partially hydrogenated derivatives (i.e. the corresponding cycloaliphatic compounds) may be used. Instead of, or in addition to using aromatic epoxy resins also aliphatic, for example acyclic, linear or branched, epoxy resins may be used.

In a particular aspect of the curable structural adhesive composition of the present disclosure, the epoxy resin comprises a combination or a mixture of two or three different epoxy resins. Preferably, the epoxy resin is liquid at room temperature but also solid epoxy resins, or resin particles may be used or may be used in dissolved form, for example dissolved or dispersed in a solvent or another liquid resin. In a typical aspect, the curable structural adhesive composition of the present disclosure comprises a mixture of liquid and solid epoxy resins, in particular a mixture of a liquid and a solid epoxy resin.

Typically, the epoxy resin is liquid. The epoxy resins may include solid epoxy resins, used in dissolved form, or dispersed, for example in another liquid resin. Preferably, the epoxy resin is liquid at ambient conditions (23° C., 1 bar). Typically, the epoxy resins may have a viscosity as measured according to ASTM D445 of from about 4 to about 10, preferably from about 4.5 to 6.0 mPa·s at 20° C.

Preferably the epoxy resins according to the present disclosure have an epoxy equivalent weight of from about 170 to 200 (ASTM D 1652).

The epoxy resins may contain halogens, preferably bromine atoms to make them less flammable.

Examples of suitable and commercially available epoxy resins include diglycidylether of bisphenol A (e.g. available under the trade designation EPON 828, EPON 830 or EPON 1001 from Hexion Speciality Chemicals GmbH, Rosbach, Germany, or under the trade designation D.E.R-331 or D.E.R-332 from Dow Chemical Co.); diglycidyl ether of bisphenol F (e.g. EPICLON 830 available from Dainippon Ink and Chemicals, Inc. or D.E.R.-354 from Dow Chemical Co. Schwalbach/Ts., Germany); diglycidyl ethers of a blend of bisphenol A and bisphenol F (e.g. EPIKOTE 232 available from Momentive Speciality Chemicals, Columbus, USA).

Other epoxy resins based on bisphenols are commercially available under the trade designations EPILOX (Leuna Epilox GmbH, Leuna, Germany); flame retardant epoxy resins are available under the trade designation D.E.R 580 (a brominated bisphenol type epoxy resin available from Dow Chemical Co.).

In a typical aspect, the curable composition of the present disclosure comprises from 10 to 70 wt %, from 10 to 60 wt %, from 15 to 50 wt %, from 15 to 40 wt %, or even from 15 to 30 wt % of epoxy resins, based on the total weight of the curable composition.

The curable composition according to the disclosure further comprises an epoxy curing agent comprising at least one cycloaliphatic amine for curing the curable epoxy resin. The curing agent comprises at least one cycloaliphatic amine. The term "cycloaliphatic amine" as used herein refers to an amine that contains at least one cycloaliphatic group. The cycloaliphatic amines are preferably primary amines and contain at least one primary amine group (e.g. —NH2 group). Typical examples of cycloaliphatic amines include primary amines containing one or two cyclohexyl, cycloheptyl, or cyclopentyl groups or combinations thereof. The cycloaliphatic group is typically in alpha-, or beta-position to the amine groups (alpha-position means directly bonded to the amine. Beta-position means the position adjacent to the alpha-position).

Particular examples of cycloaliphatic amine curing agents include, but are not limited to, 1,4-diaminocyclohexane; 4,4'-diaminodicyclohexylmethane; 1,3-diaminocyclopentane; 4,4'-diaminodicyclohexylsulfon; 4,4'-diamino-dicyclohexyl-propane-1,3; 4,4'-diamino-dicyclohexyl-propane-2,2; 3,3'-dimethyl-4,4'-diamino dicyclohexylmethane; 3-aminomethyl-3,3,5-trimethyl cyclohexyl amine (Isophorone diamine) or aminomethyl tricyclodecane.

Suitable cycloaliphatic amine curing agents are commercially available under the trade designation ANCAMINE 2264, ANCAMINE 2280, ANCAMINE 2286 (from Air-product and Chemical Inc, Allentown, Pa., USA) or BAXXODUR EC 331 (from BASF, Ludwigshafen, Germany) or VERSAMINE C31 (from Cognis, Monheim, Germany) or EPICURE 3300 (from Momentive Specialty Chemicals, Inc, Columbus, Ohio, USA). According to a preferred aspect, the cycloaliphatic amine curing agent for use herein is chosen to be VERSAMINE C31.

In a typical aspect, the curable composition of the present disclosure comprises from 10 to 50 wt %, from 15 to 40 wt %, or even from 15 to 30 wt % of an epoxy curing agent comprising at least one cycloaliphatic amine, based on the total weight of the curable composition. Typically, the ratio of cycloaliphatic amines to epoxy groups is chosen to be about 2:1 with a deviation of about 10%. This means that typically within this variation the curable compositions contain one amine group per two epoxy groups.

The curable composition according to the disclosure further comprises a metal triflate catalyst in an amount of at least 3 wt %, based on the total weight of the curable composition.

Suitable metal triflate catalysts for use herein may be easily identified by those skilled in the art. Exemplary metal triflate catalysts for use herein include, but are not limited to, those selected from the group of group I metal, group II metal, and lanthanoid cations of triflate. In some executions, the group I metal cation is lithium. In some executions, the group II metal cation is calcium or magnesium.

In a preferred aspect of the curable composition according to the present disclosure, the metal triflate catalyst for use herein is selected from the group consisting of calcium triflate, magnesium triflate, lithium triflate, lanthanum triflate, and any combinations or mixtures thereof. In a more preferred aspect, the metal triflate catalyst is selected from the group consisting of calcium triflate and magnesium triflate. In still another particular aspect, the metal triflate catalyst comprises calcium triflate.

In a preferred aspect, the curable composition of the present disclosure comprises at least 3.5 wt %, at least 4.0 wt %, at least 4.5 wt %, at least 5.0 wt %, at least 5.5 wt %, or even at least 6 wt % of a metal triflate catalyst, based on the total weight of the curable composition.

According to a particular aspect, the curable composition of the present disclosure comprises less than 15 wt %, less than 12 wt %, less than 10 wt %, or even less than 8 wt % of a metal triflate catalyst.

The curable compositions provided by the present disclosure may comprise, as an optional ingredient, at least one fatty acid polyamide. Fatty acid polyamides for use herein may be easily identified by those skilled in the art in the light of the present disclosure. Suitable fatty acid polyamides for use herein preferably melt at a temperature between about 100° C. to about 155° C., more preferably between about 120° C. to about 140° C. The fatty acid polyamide may have a melting point or a melting range at those temperatures.

The fatty acid polyamides preferably contain at least two end-groups according to the formula (I):

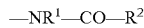

—NR$^1$—CO—R$^2$ wherein R$^1$ represents H or an alkyl group having from 1 to 4 carbon atoms, preferably R$^1$ represents H. R$^2$ represents a saturated or unsaturated but preferably saturated alkyl chain containing from 3 to 27 carbon atoms, preferably from 11 to 23 carbon atoms. The chain may be linear or branched or cyclic. Preferably the chain is saturated. The fatty acid polyamide can typically be obtained from the condensation reaction of a carboxylic acid according to formula (III):

MOOC—R$^2$ which preferably is a fatty acid or a combination of fatty acids with the primary or secondary amine groups of a diamine or polyamine.

Typically, the carboxylic acid is a carboxylic acid according to the formula (III) wherein R$^2$ is a defined above. Preferably, the carboxylic acid is a fatty acid or a mixture of fatty acids or a mixture of carboxylic acids. The carboxylic acids may be saturated or unsaturated and typically contain from 4 to 28 carbon atoms, preferably from 12 to 24 carbon atoms. Examples of useful carboxylic acids include fatty acids, for example saturated fatty acids. Examples of saturated fatty acids include but are not limited to hexanoic acid, nonanoic acid, dodecanoic acid, tetradecanoic acid, hexadecanoic acid, and octadecanoic acid and mixtures containing them. Examples of useful unsaturated fatty acids include ricinoleic acid ((9Z,12R)-12-Hydroxyoctadec-9-enoic acid), oleic acid ((9Z)-Octadec-9-enoic acid) and linoleic acid (cis, cis-9,12-Octadecadienoic acid). The fatty acids may be synthetic origin or may be from natural occurring origin, such as vegetable oils, including castor oil, soybean oil, tall oil, and linseed oil. Partially or fully hydrogenated vegetable oil, such as for example hydrogenated castor oil, may also be used.

Useful diamines or polyamines for the preparation of the fatty acid polyamide include aliphatic, cycloaliphatic or aromatic diamines. The diamines or polyamines typically have from 2 to 40 carbon atoms. Preferably, the amines are diamines. Examples of useful diamines include, but are not limited to, ethylene diamine, 1,2-diaminopropane, 1,3-diaminopropane, 1,4-diaminobutane, p-xylene diamine, 1,6-hexamethylene diamine, 2-methypentamethylene diamine, 4,4'-methylene bis(cyclohexylamine), 2,2-di-(4-cyclohexylamine), 2,2-di(4-cyclohexylamine) propane, polyglycol diamines, isophorone diamine, m-xylene diamine, cyclohexane bis(methylamine), bis-1,4-(2'-aminoethyl)benzene, 9-aminomethylstearylamine, 10-aminoethylstearylamine, 1,3-di-4-piperidyl propane, 1,10-diaminodecane, 1,12-diaminododecane, 1,18-diaminooctadecane, piperazine, N-aminoethylpiperazine and bis-(3-aminopropyl)piperazine.

Fatty acid polyamides useful as optional ingredient in the curable composition according to the invention are commercially available under the trade designation DISPARLON, including DISPARLON 6100, 6200, 6500, 6600, 6650 or 6700 (available from Kusumoto Chemicals Ltd., Japan) or LUVOTIX, including LUVOTIX HT (available from Lehmann & Voss & Co., Germany). Mixtures of fatty acid polyamides can also be used.

The weight percent of the fatty acid polyamide for optional use in the curable composition is typically comprised from 0.1 to 10 wt %, 0.1 to 5 wt %, from 0.2 to 4 wt %, from 0.3 to 4 wt %, or even from 0.2 to 2 wt %, by weight based on the total weight of the curable composition.

The fatty acid polyamides may be combined with hydrocarbon oils or hydrocarbon solids which preferably melt at a temperature between 50° C. and 100° C.

The curable composition according to the disclosure may comprise as a further optional ingredient, at least one filler. Any commonly known filler may be used in the context of the present disclosure. Fillers for use herein may be easily identified by those skilled in the art in the light of the present disclosure. Suitable fillers for use herein include, but are not limited to, those comprising talc, coal tar, carbon black, textile fibers, glass fibers, aramid pulp, boron fibers, carbon fibers, sheet silicates or clays (such as, for example, mica, bentonite, wollastonite, kaolin), phosphates, silica, inorganic or organic microspheres or beads, hollow particles, and any combinations or mixtures thereof.

In some aspects, the mechanical strength of the curable compositions may be improved at room temperature, if the filler is a particle and not a fiber. In particular, the filler particle may be advantageously selected from amorphous silica, metal particles or powders, aluminium hydrates or glass microspheres. The particles may be preferably spherical or substantially spherical particles. The filler particles may typically have a particle size of from about 0.5 to about 500 µm, or from about 1 to about 50 µm. Advantageously, the majority of the filler particles has an average particle size of from about 0.8 to about 100 µm or from about 5 to about 50 µm.

In some advantageous aspects, the filler particles for use herein include silica particles, in particular amorphous (non-hollow) silica particles, hollow silica particles (hollow glass microspheres), metal particles or aluminium hydrate particles. Silica particles as described above may further improve the mechanical strength of the curable composition at elevated temperatures. Filler particles for use herein include fused silica. In some aspects, the curable composition may contain amorphous silica particles such as, for example, fused silica and hollow glass microspheres. The presence of amorphous silica particles may in some aspects improve the mechanical strength of the curable composition at elevated temperatures. Fused silica is available, for example, under the trade designation MINSIL from Minco Inc., Midway, USA. Hollow glass microspheres are available under the trade designation MICROBUBBLES from 3M Company, St. Paul, Minn., USA.

According to a preferred aspect of the curable composition according to the disclosure, the filler for use herein may be selected from the group of hollow particles (also referred to hereinafter as "light weight filler"), preferably hollow glass particles. The light weight filler typically is capable of reducing the density of the composition. Capable of reducing the density of the composition as used herein means the filler has a lower density than the composition without the filler. Fillers capable of reducing the density of the composition include inorganic and organic materials, like low density inorganic fillers, (i.e., fillers having a density of between about 0.1 to about 0.5 g/cm$^3$) and low density organic fillers (i.e., fillers having a density of between about 0.05 to about 0.40 g/cm$^3$).

A combination of organic and inorganic fillers may be used but the inorganic low density fillers are preferably used in excess over the organic fillers. Preferably, the light weight filler material is selected from hollow particles, such as for example hollow inorganic or organic particles, preferably inorganic particles, for example inorganic microspheres. The hollow part of the particles may be filled by a gas or mixtures of gasses, a liquid or mixtures thereof, or a mixture of one or more gases and one or more liquids, or may be a vacuum. The inorganic microspheres may be selected from a variety of materials including by way of example glass, or ceramic (including sol-gel derived). The inorganic particles typically contain silicon-oxides, aluminium oxides or combinations thereof.

The inorganic particles may be in the form of free flowing powders. Preferably, they have a relatively homogenous particle size. The average particle size is typically less than 500 µm, preferably between 1 and 300 µm, preferably from 5 to 200 µm and more preferably between 10 and 100 µm. The average can be expressed as D50 value, i.e. 50% by weight of the particles have a particle size as specified above. The D50 value can be determined by sieving. The inorganic microspheres preferably exhibit a density of less than 0.5 g/cm$^3$, more preferably of between 0.1 and 0.45 g/cm$^3$ and especially preferably of between 0.12 and 0.42 g/cm$^3$.

Preferred hollow inorganic microspheres include glass microspheres which are commercially available, for example, from 3M Company under the trade designation GLASS BUBBLES D32 or K42HS and SCOTCHLITE D32/4500.

The compositions provided herein may also contain organic microspheres. The organic microspheres are polymeric microspheres. Polymeric microspheres are made of organic polymers, i.e. materials comprising repeating units derived from monomers containing at least one unsaturated carbon-carbon bond. Typical examples of suitable polymers include, but are not limited to, acrylonitrile polymers or copolymers, acrylate polymers or copolymers, vinylidene polymers or copolymers, polyacetate polymers or copolymers, polyester polymers or copolymers, vinylidenechloride/acrylonitrile copolymers, acrylate/acrylonitrile copolymers or combinations thereof.

The average diameter of the organic microspheres is preferably between 15 and 200 µm, and more preferably between 20 and 180 µm. Typically, the density of the organic microspheres is between 0.05 and 0.40 g/cm$^3$.

Low density organic fillers may be selected from unexpanded and pre-expanded organic hollow microspheres. Unexpanded organic hollow microspheres are available, for example, from Akzo Nobel under the trade designation EXPANCEL. Unexpanded organic hollow microspheres are sometimes also referred to as expandable organic rnicrobalioons which are also available, for example, from Lehmann and Voss, Hamburg, Germany under the trade designation MICROPEARL. Pre-expanded organic hollow microspheres are commercially available, for example, under the trade designation DUALITE from Henkel Corporation, Conn., USA. In one aspect, the curable compositions of the present disclosure comprise a combination of inorganic and organic particles as described above.

The concentration and the nature of the fitters for use in the curable compositions is preferably selected such that the density of the curable composition is less than 0.9 g/cm$^3$, less than 0.8 g/cm$^3$, or even comprised between about 0.4 and 0.6 g/cm$^3$.

In a typical aspect, the curable composition of the present disclosure comprises from 1 to 50 wt %, from 2 to 50 wt %, from 2 to 40 wt %, from 3 to 40 wt %, from 3 to 30 wt %, from 5 to 30 wt %, or even from 5 to 20 wt % of a filler material, based on the total weight of the curable composition.

The curable compositions of the present disclosure may further comprise a wide variety of additional, optional, ingredients and adjuvants, which may be used to achieve optimized performance or to adapt the compositions to the desired applications. Further optional ingredients may also be used to further regulate rheological properties or to adapt the visual appearance of the compositions.

Optional ingredients for use herein may be selected from the group consisting of fillers other than those described above, thixotropic agents, reactive diluents, secondary curatives, pigments, antioxidants, adhesion promoters, fire retardants, wetting agents, corrosion inhibitors and rheology controlling agents, toughening agents, anti-sagging agents, dispersing additives, air releasing agents, anti-settling agents, and any combinations or mixtures thereof.

Reactive diluents may be added to control the flow characteristics of the composition. Suitable diluents can have at least one reactive terminal end portion and, preferably, a saturated or unsaturated aliphatic cyclic backbone. Preferred reactive terminal end portions include glycidyl ether. Examples of suitable diluents include glycidyl ethers of monofunctional saturated or unsaturated, branched or unbranched, cyclic or open-chain aliphatic $C_4$-$C_{30}$ alcohols, such as e.g. butyl glycidyl ether, hexyl glycidyl ether, 2-ethylhexyl glycidyl ether, allyl glycidyl ether, trimethoxysilyl glycidyl ether etc.; glycidyl ethers of difunctional saturated or unsaturated, branched or unbranched, cyclic or open-chain aliphatic $C_4$-$C_{30}$ alcohols, e.g. ethylene glycol glycidyl ether, butanediol glycidyl ether, hexanediol glycidyl ether, octanediol glycidyl ether, cyclohexane dimethanol diglycidyl ether, neopentyl glycol diglycidyl ether etc.; glycidyl ethers of trifunctional or polyfunctional, saturated or unsaturated, branched or unbranched, cyclic or open-chain aliphatic alcohols such as epoxidized trimethylolpropane, epoxidized pentaerythrol, or polyglycidyl ethers of aliphatic polyols such as sorbitol, glycerol or trimethylolpropane.

The di- or triglycidyl ethers of cyclohexane dimethanol, neopentyl glycol and trimethylolpropane are preferred. Commercially available reactive diluents are for example under the trade designations "Reactive Diluent 107" from Hexion or "Epodil 757" from Air Products and Chemical Inc, Allentown, Pa., USA. Reactive diluents may be added in amounts up to 15% by weight based on the total curable composition, typically from about 0.5 to about 8% by weight based on the total weight of the curable composition.

Secondary curatives may be added to increase the curing speed. Useful secondary curatives include imidazoles, imidazole-salts, imidazolines or aromatic tertiary amines including those having the structure of formula (IV):

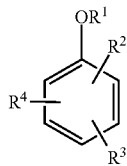

wherein
$R^1$ is H or alkyl, such as, e.g., methyl or ethyl, preferably methyl; $R^2$ is $CHNR^5R^6$;
$R^3$ and $R^4$ may be, independently from each other, present or absent and when present $R^3$ and $R^4$ are $CHNR^5R^6$; $R^5$ and $R^6$ are, independent from each other, alkyl, preferably $CH_3$ or $CH_2CH_3$.

An example of a useful secondary curative is tris-2,4,6-(dimethyl amino methyl)phenol, commercially available as ANCAMINE K54 from Air Products Chemicals Europe B.V.

Further materials include wetting agents. The wetting agent improves the mixability and processability of the composition and can also enhance the composition's handling characteristics. Wetting agents may be added to improve the dispersion of ingredients, in particular fillers. Suitable wetting agents include long chain carboxylic acids, long chain sulfonic acids and phosphoric acid esters. Other examples of suitable wetting agents include titanates, silanes, zirconates, zircoaluminates. Preferably, the wetting agents are used as mixtures. Examples of useful commercial wetting agents include, for example but not limited thereto, silanes, commercially available as SILANE Z-6040 (DOW-Corning) and phosphoric acid esters commercially available from BYK Chemie GmbH. The concentration of the wetting agent is typically lower than 6 percent by weight and more preferably not more than 5 percent by weight based on the total weight of the composition.

Pigments may include inorganic or organic pigments including ferric oxide, brick dust, carbon black, titanium oxide, Chromophtal blue and the like. Different pigments may be added to the individual reactive components (or pigments may be added to one component but not to the other) in case of 2K (two component) compositions to allow to visibly determine the preparation of a homogeneous mixture of the components.

Toughening agents are polymers capable of increasing the toughness of cured epoxy resins. The toughness can be measured by the peel strength of the cured compositions. Typical toughening agents include core/shell polymers, butadiene-nitrile rubbers, and acrylic polymers and copolymers.

In some aspects, the toughening agent may be a core/shell polymer. In some other aspects, the core may be an elastomer, e.g., an elastomer having a glass transition temperature lower than 0° C. According to one specific aspect, the core comprises a butadiene polymer or copolymer (e.g., a butadiene-styrene copolymer), an acrylonitrile polymer or copolymer, an acrylate polymer or copolymer, or combinations thereof. In some aspects, the polymers or copolymers of the core may be cross-linked. Generally, the shell comprises one or more polymers grafted on to the core. In some aspects, the shell polymer has a high glass transition temperature, i.e. a glass transition temperature greater than 26° C. The glass transition temperature may be determined by dynamic mechanical thermo analysis (DMTA) ("Polymer Chemistry, The Basic Concepts, Paul C. Hiemenz, Marcel Dekker 1984).

Exemplary core/shell polymers and their preparation are described in, e.g., U.S. Pat. No. 4,778,851. Commercially available core/shell polymers include, e.g., PARALOID EXL 2600 from Rohm & Haas Company, Philadelphia, USA, and KANE ACE MX120 from Kaneka, Belgium. In some aspects, the core/shell polymer has an average particle size of at least 10 nm, e.g., at least 150 nm. In some other aspects, the core/shell polymer has an average particle size of no greater than 1,000 nm, e.g., no greater than 500 nm.

In some other aspects, the core/shell polymer, if present, may be present in an amount of at least 5 wt. %., e.g., at least 7 wt. %, based on the weight of the total composition. In a particular aspect, the core/shell polymer may be present in an amount no greater than 50 wt. %, e.g., no greater than 30 wt. %, e.g., no greater than 15 wt. %, based on the weight of the total composition.

In the context of the present disclosure, it has been surprisingly discovered that the curable compositions as described herein, advantageously result upon curing in a cured composition having excellent compressive strength over a wide temperature range, for example a compression strength of at least 50 MPa at 23° C. and at least 10 MPa at 80° C.

This excellent compressive strength may be obtained without adding polymeric tougheners. The addition of polymeric tougheners may typically increase the viscosity of the curable composition to such an extent that they may become no longer extrudable at low pressure at room temperature (i.e. at pressures between about 4 to 10 bar at 23° C.). Polymeric tougheners are known in the art as organic (i.e. hydrocarbon-based) polymers that can be added to curable epoxy compositions to increase the toughness of the resulting cured composition. Typically, polymeric tougheners, when added at a weight ratio of from 0.1, preferably at 0.5% by weight based on the weight of the epoxy-resins, may increase the tensile strength of the cured composition by more than 5%. Polymeric tougheners may be solid or liquid. Typically solid polymeric tougheners are block copolymers or core-shell polymers, such as copolymers of monomers having an olefinic double bond, typically one in which the double bond is conjugated directly with a hetero atom or with at least one other double bond. Such monomers are typically selected from the group including styrene, butadiene, acrylonitrile, and vinyl acetate. Liquid polymeric tougheners are typically based on a polyurethane polymers, nitrile butadiene polymers or polyacrylate rubbers.

Accordingly, in a typical particular aspect, the curable composition according to the present disclosure is free of polymeric toughening agents.

In a particular aspect, the curable composition according to the present disclosure comprises:
a) from 10 to 70 wt %, from 10 to 60 wt %, from 15 to 50 wt %, from 15 to 40 wt %, or even from 15 to 30 wt % of an epoxy resin;

b) from 10 to 50 wt %, from 15 to 40 wt %, or even from 15 to 30 wt % of an epoxy curing agent comprising at least one cycloaliphatic amine;
c) from 3 to 8 wt %, from 4 to 7 wt %, or even from 4 to 6 wt % of a metal triflate catalyst;
d) optionally, from 0.1 to 5 wt %, from 0.2 to 4 wt %, from 0.3 to 4 wt %, or even from 0.2 to 2 wt % of a fatty acid polyamide; and
e) optionally, from 1 to 50 wt %, from 2 to 40 wt %, from 3 to 30 wt %, or even from 5 to 20 wt % of a filler material preferably comprising hollow particles.

According to a preferred aspect of the present disclosure, the curable composition is a two part composition comprising, separated from each other, a first component comprising the epoxy resin and a second component comprising the epoxy curing agent and the metal triflate catalyst.

According to a particular aspect, the curable composition according to the present disclosure provides a time to reach Shore D≥50 of less than 90 min, less than 80 min, less than 70 min, less than 60 min, or even less than 50 min, when measured at 23° C. according to the test method described in the experimental section.

In a preferred aspect, the curable composition according to the present disclosure has an extrusion rate of at least 20 g/min, at least 30 g/min, at least 40 g/min, at least 50 g/min, or even at least 60 g/min, when being extruded at a temperature of 23° C. and a pressure of 5 bar for 60 seconds through a circular aperture having a diameter of 4.0 mm.

According to still another aspect, the curable composition according to the present disclosure has a compression strength at 23° C. of at least 30 MPa, at least 40 MPa, or even at least 50 MPa, when measured according to the test method described in the experimental section.

According to another aspect of the present disclosure, it is provided a method of filling voids in a sandwich structure, which comprises the steps of:
a) providing a curable composition as described above;
b) filling at least part of the voids comprised in the sandwich structure with the curable composition; and
c) allowing the curable composition to cure.

Any commonly known sandwich structure may be used in the context of the present disclosure. Sandwich structures for use herein may be easily identified by those skilled in the art in the light of the present disclosure.

Suitable sandwich structures for use herein include, but are not limited to, those comprising a core material selected from the group consisting of honeycomb structures (such as e.g. metal—aluminium, steel; Nomex—aramid fibre dipped in resin (epoxy, phenolic or polyamide) honeycomb structures), open and closed-cell-structured foams (such as e.g. polyvinylchloride, polyurethane, polyethylene, polystyrene or metal foams), expanded or extruded foams (such as e.g. polymer—polyurethane, epoxy, metal—aluminium foams), syntactic foams, solid cores (such as e.g. wood—balsa; polymer—epoxy cores), and any combinations thereof.

Suitable sandwich structures for use herein include, but are not limited to, those comprising a skin material selected from the group consisting of FRP (fibre reinforced polymer—thermoplastic and thermoset), polymers, wood, aramid sheet, metals (such as e.g. aluminum, titanium, steel), ceramic, laminates of glass or carbon fiber-reinforced thermoplastics or thermoset polymers (such as e.g. unsaturated polyesters or epoxies), and any combinations thereof.

Particularly suitable sandwich structures for use herein include, but are not limited to, those comprising honeycomb structures.

According to a preferred aspect of the present disclosure, the sandwich structure for use herein comprises a honeycomb structure, and is preferably in the form of a structural panel, as commonly used in the interior of aircrafts.

In still another aspect, the present disclosure relates to a method of potting an insert in a sandwich structure, comprising the steps of:
a) providing an insert in a sandwich structure;
b) optionally, inserting a hardware into the insert;
c) filling, at least partially, the insert with a curable composition as described above; and
d) allowing the curable composition to cure into the insert.

According to a preferred aspect of the method of potting an insert according to the present disclosure, the sandwich structure is a honeycomb structure.

Any hardware commonly known in the art may be used in the present disclosure Suitable hardware for use herein may be easily identified by those skilled in the art, in the light of the present disclosure. Exemplary hardware for use herein include, but are not limited to, mechanical fasteners, such as e.g. bolts, screws, and any combinations thereof.

In a particular aspect, the hardware for use herein is selected from the group of mechanical fasteners, in particular metallic mechanical fasteners.

According to another aspect, the present disclosure relates to a composite assembly comprising a sandwich structure provided with voids, wherein at least part the voids are filled with a curable composition as described above. Preferably, the sandwich structure is a honeycomb structure.

According to a particular aspect of the composite assembly of the present disclosure, the sandwich structure is provided with an insert. According to still another particular aspect, a hardware is inserted into the insert. In a preferred aspect, the hardware is selected from the group of mechanical fasteners, in particular metallic mechanical fasteners.

According to another aspect, the present disclosure relates to the use of a curable composition or a composite assembly as described above for industrial applications. The curable composition or the composite assembly as described above may be particularly suitable for manufacturing and repairing operations in construction, automotive, aeronautics or aerospace industries.

According to still another aspect, the present disclosure relates to the use of a curable composition as described above for filling voids in a sandwich structure, in particular a honeycomb structure.

According to yet another aspect, the present disclosure relates to the use of a curable composition as described above for potting an insert in a sandwich structure, in particular a honeycomb structure, wherein a hardware is preferably inserted into the insert.

Item 1 is a curable composition comprising:
a) an epoxy resin;
b) an epoxy curing agent comprising at least one cycloaliphatic amine;
c) at least 3 wt % of a metal triflate catalyst;
d) optionally, a fatty acid polyamide; and
e) optionally, a filler material.

Item 2 is a curable composition according to item 1, which comprises at least 3.5 wt %, at least 4.0 wt %, at least 4.5 wt %, at least 5.0 wt %, at least 5.5 wt %, or even at least 6 wt % of a metal triflate catalyst.

Item 3 is a curable composition according to item 1 or 2, which comprises less than 15 wt %, less than 12 wt %, less than 10 wt %, or even less than 8 wt % of a metal triflate catalyst.

Item 4 is a curable composition according to any of the preceding items, wherein the metal triflate catalyst is selected from the group consisting of calcium triflate, magnesium triflate, lithium triflate, lanthanum triflate, and any combinations or mixtures thereof.

Item 5 is a curable composition according to any of the preceding items, wherein the metal triflate catalyst is selected from the group consisting of calcium triflate and magnesium triflate.

C. The glasscurable composition according to any of the preceding items, wherein the metal triflate catalyst comprises calcium triflate.

Item 7 is a curable composition according to any of the preceding items, which comprises an aromatic epoxy resin.

Item 8 is a curable composition according to item 7, wherein the aromatic epoxy resin comprises repeating units obtainable by a polymerisation of a dihydric phenol with epichlorohydrine.

Item 9 is a curable composition according to any of the preceding items, wherein the fatty acid polyamide has a melting point comprised between 100° C. and 145° C., and wherein the fatty acid polyamide preferably comprises at least two end-groups according to formula (I):

wherein $R^a$ represents H or an alkyl group having from 1 to 4 carbon atoms and $R^b$ represents a saturated or unsaturated alkyl chain containing from 3 to 27 carbon atoms.

Item 10 is a curable composition according to any of the preceding items, wherein the filler material comprises hollow particles, preferably hollow glass particles.

Item 11 is a curable composition according to any of the preceding items, wherein the cycloaliphatic amine is selected from the group consisting of 1,4-diaminocyclohexane; 4,4'-diaminodicyclohexylmethane; 1,3-diamino cyclopentane; 4,4'-diamino dicyclohexylsulfone; 4,4'-diamino-dicyclohexyl-propane-1,3; 4,4'-diamino-dicyclohexyl-propane-2,2; 3,3'-dimethyl-4,4'-diamino dicyclohexylmethane; 3-aminomethyl-3,3,5-trimethyl cyclohexyl amine (Isophorone diamine); aminomethyl tricyclodecane; and any combinations or mixtures thereof.

Item 12 is a curable composition according to any of the preceding items, which is free of polymeric toughening agents.

Item 13 is a curable composition according to any of the preceding items, which provides a time to reach Shore D≥50 of less than 90 min, less than 80 min, less than 70 min, less than 60 min, or even less than 50 min, when measured at 23° C. according to the test method described in the experimental section.

Item 14 is a curable composition according to any of the items, which has an extrusion rate of at least 20 g/min, at least 30 g/min, at least 40 g/min, at least 50 g/min, or even at least 60 g/min, when being extruded at a temperature of 23° C. and a pressure of 5 bar for 60 seconds through a circular aperture having a diameter of 4.0 mm.

Item 15 is a curable composition according to any of the preceding items, which has a compression strength at 23° C. of at least 30 MPa, at least 40 MPa, or even at least 50 MPa, when measured according to the test method described in the experimental section.

Item 16 is a curable composition according to any of the preceding items, which is a two part composition comprising separated from each other a first component comprising the epoxy resin and a second component comprising the epoxy curing agent and the metal triflate catalyst.

Item 17 is a curable composition according to any of the preceding items, which comprises:
 a) from 10 to 70 wt %, from 10 to 60 wt %, from 15 to 50 wt %, from 15 to 40 wt %, or even from 15 to 30 wt % of an epoxy resin;
 b) from 10 to 50 wt %, from 15 to 40 wt %, or even from 15 to 30 wt % of an epoxy curing agent comprising at least one cycloaliphatic amine;
 c) from 3 to 8 wt %, from 4 to 7 wt %, or even from 4 to 6 wt % of a metal triflate catalyst;
 d) optionally, from 0.1 to 5 wt %, from 0.2 to 4 wt %, from 0.3 to 4 wt %, or even from 0.2 to 2 wt % of a fatty acid polyamide; and
 e) optionally, from 1 to 50 wt %, from 2 to 40 wt %, from 3 to 30 wt %, or even from 5 to 20 wt % of a filler material preferably comprising hollow particles.

Item 18 is a composite assembly comprising a sandwich structure provided with voids, wherein at least part the voids are filled with a curable composition according to any of the preceding items.

Item 19 is a composite assembly according to item 18, wherein the sandwich structure comprises a honeycomb structure.

Item 20 is a composite assembly according to any of item 18 or 19, wherein the sandwich structure is provided with an insert.

Item 21 is a composite assembly according to item 20, wherein a hardware is inserted into the insert.

Item 22 is a composite assembly according to item 21, wherein the hardware is selected from the group of mechanical fasteners, in particular metallic mechanical fasteners.

Item 23 is a method of filling voids in a sandwich structure, comprising the steps of:
 a) providing a curable composition according to any of items 1 to 17;
 b) filling at least part of the voids comprised in the sandwich structure with the curable composition; and
 c) allowing the curable composition to cure.

Item 24 is a method of filling voids according to item 23, wherein the sandwich structure is a honeycomb structure.

Item 25 is a method of potting an insert in a sandwich structure, comprising the steps of:
 a) providing an insert in a sandwich structure;
 b) optionally, inserting a hardware into the insert;
 c) filling, at least partially, the insert with a curable composition according to any of items 1 to 17; and
 d) allowing the curable composition to cure into the insert.

Item 26 is a method of potting an insert according to item 25, wherein the sandwich structure is a honeycomb structure.

Item 27 is a method of potting an insert in a sandwich structure according to any of items 25 or 26, wherein the hardware is selected from the group of mechanical fasteners, in particular metallic mechanical fasteners.

Item 28 is the use of a curable composition according to any of items 1 to 17 for industrial applications, in particular for manufacturing and repairing operations in construction, automotive, aeronautics or aerospace industries.

Item 29 is the use of a curable composition according to any of items 1 to 17 for filling voids in a sandwich structure, in particular a sandwich structure comprising a honeycomb structure.

Item 30 is the use of a curable composition according to any of items 1 to 17 for potting an insert in a sandwich structure, in particular a honeycomb structure, wherein a hardware is preferably inserted into the insert.

EXAMPLES

The invention is further illustrated by the following examples. These examples are merely for illustrative purposes only and are not meant to be limiting on the scope of the appended claims.

Test Methods Applied:

Compressive Strength

After curing, the cured specimens are removed from the mould and subjected to compression test according to ISO 604 procedure. The test specimens are compressed until failure along their 25 mm axis at a rate of 0.5 mm/min by using a Zwick Model Z030 Tensile Tester (Zwick GmbH & Co KG, Ulm, Germany), equipped with heating chamber. The compressive strength is measured both at room temperature (23° C.) and at 80° C. The test specimens are preconditioned in the heated equipment for at least 30 minutes before testing at 80° C. At least three samples are measured for each epoxy composition and the results averaged and recorded in MPa.

Density

After curing, the cured specimens are removed from the mould and their exact dimensions recorded. Each sample is weighed and the density calculated and recorded in grams per $cm^3$.

Extrusion Rate

A 200 ml Cartridge for 2K compositions (Sulzer Mixpac AG, Haag, Switzerland) is filled manually to 200 ml with parts B and parts A in a ratio of 2:1 by volume. A mixing nozzle of type MC 13-18 (static 2K mixer from Sulzer Mixpac AG, Haag, Switzerland) is fitted to the cartridge. The mixing nozzle has a circular outlet nozzle having a diameter of 4.0 mm. The product is extruded from the cartridge by using a pneumatic dispensing gun. The extrusion rate is determined by measuring the quantity extruded applying a pressure 5 bar for 60 seconds. Measurements are made at room temperature. Each composition is tested 3 times and the results are expressed in g/min and represent the average from the three measurements.

Time to Reach Shore D≥50 (min at 23 ° C.)

After extrusion from the dual pack cartridge, the mixed composition is placed on a plane substrate and the time is set as $T_0$. The hardness (expressed in shore D units) is measured every 15 minutes according to ISO 868R test method. The time at which Shore D of at least 50 is reached is recorded using a regular stopwatch. Each composition is tested 3 times and the results are expressed in min and represent the average from the three measurements.

Flammability Test F1

The flammability is measured by a vertical 60 min flame test conducted on a 3 mm thick cured epoxy resin in accordance to FAR 25.853 (a) Appendix F, Part 1 & AITM 2.002A.

Materials Employed:

ANCAMINE K54: Tris-2,4,6-dimethyl amino methylphenol (Air Products and Chemicals, Inc., Allentown/Pa./USA).

EPODIL 757: 1,4-cyclohexane dimethanol diglycidyl ether (Air Products and Chemicals Inc., Allentown, Pa./USA).

GLASS BUBBLES D32: hollow glass particles, density 0.32 g/cc (3M Company, USA); Z-6040: epoxy silane (Dow Corning, Germany).

EPIKOTE 232: low-medium viscosity epoxy resin consisting of a blend of bisphenol A and bisphenol F resin (Resolution advanced materials).

DISPERLON 6500: non-reactive polyamide (King Industries, Norwalk, Conn.).

JEFFAMINE D-230: polyether diamine curing agent (Huntsman).

VERSAMINE C31: cycloaliphatic amine curing agent (Cognis).

TTD: trioxatridecane diamine (BASF).

ANCAMID 910: polyamido amine (Air Products).

INTUMAX AC-2: phosphate based halogen free fire retardant intumescent agent (Broadview Technologies Inc.).

EXOLIT EP 935D: flame retardant (Clariant).

BYK W9010: Phosphoric Acid Ester (BYK Chemie GmbH).

CALCIUM TRIFLATE: available from Sigma Aldrich.

Preparation of Two Part Epoxy Compositions:

Two part epoxy compositions of examples 1 and 2 and of comparative examples C-1 to C-6 are prepared according to the general procedure as outlined for example 1:

Preparation of Part A1 (Curative)

Part A1 is formulated by first blending calcium triflate with VERSAMINE C31 using a high speed mixer (DAC 150 FVZ Speed mixer, Hauschild Engineering, Germany) at 3000 rpm. Some glass bubbles are added to facilitate the dispersion of calcium triflate. The mixing is repeated until no crystals of calcium triflate are visible. Then, the ANCAMINE K54 is added and the mixture is mixed for 1 min at 3000 rpm. As final step, the remaining part of glass bubbles is incorporated in 2 times to ensure a homogeneous paste. After all raw materials have been added, the mixture is degassed and filled into the first unit of a dual pack cartridge. Part A2 of example 2 and parts A3 to A8 of comparative examples C-1 to C-6 respectively are prepared in the same way with the ingredients as listed in Table 1.

Preparation of Part B:

EPIKOTE 232 and DISPARLON 6500 are mixed for 1 min at 3000 rpm with a high speed mixer (DAC 150 FVZ Speedmixer, Hauschild Engineering). The mixture is then kept in an air circulating oven at 90° C. during 60 min. The mixture is cooled to room temperature. BYK W9010 is added and mixed for 1 min. This is followed by the addition of EXOLIT OP 935D & INTUMAX AC and mixing for 1 min at 3000 rpm. Then EPODIL 757 and the epoxy silane are added, then mixed and homogenized. Then glass bubbles are added in 2 portions and mixed until homogeneity. The homogeneous paste is filled in the second unit of the above mentioned dual pack cartridge.

Mixing of Part A and Part B and Extrusion:

A dual pack Cartridge (Sulzer Mixpac AG, Haag, Switzerland) is filled manually to 200 ml with parts B and parts A in a ratio of 2:1 by volume.

A mixing nozzle of type MC 13-18 (4.0 mm aperture Sulzer Mixpac AG, Haag, Switzerland) is fitted to the cartridge. The product is extruded from the cartridge by using a pneumatic dispensing gun at a pressure of 5 bar, directly into a silicon mould having the dimensions of 12.5 mm (height)×12.5 mm (width)×25 mm (length) and being open on one major side. The filled units are then left to cure at room temperature (23° C. & 50% relative humidity) for 7 days.

EXAMPLES

Examples 1 and 2 and Comparative Examples C-1 to C-6

In examples 1 and 2, curable compositions are prepared from parts A1 and A2, comprising cycloaliphatic amine and calcium triflate in different amounts and Part B, comprising epoxy resin. Comparative example C-1 is made from Part A3, comprising cycloaliphatic amine and low amount of calcium triflate, and Part B, comprising epoxy resin. Comparative examples C-2 and C-3 are made with parts A4 and A5, comprising polyether diamine, rather than cycloaliphatic amine, and calcium triflate. Comparative example C-4 is made with part A6, comprising polyamido amine, rather than cycloaliphatic amine, and calcium triflate. Comparative examples C-5 and C-6 are made with parts A7 and A8, comprising cycloaliphatic amine and calcium nitrate, rather than calcium triflate. The ingredients and their amounts in the A and B parts are indicated in Tables 1 and 2. Curable compositions are prepared by mixing the respective A and B parts in a 200 ml dual pack cartridge. Extrusion, curing and examination of the samples are done according to the general procedures given above. Test results are shown in Table 3.

TABLE 2

Composition of the B-part.

| Ingredients (in % by weight) | B |
|---|---|
| EPIKOTE 232 | 39 |
| EPODIL 757 | 8 |
| GLASS BUBBLES D32 | 20 |
| Z-6040 | 2.5 |
| DISPARLON 6500 | 1 |
| BYK W9010 | 1.5 |
| INTUMAX AC | 8 |
| EXOLIT OP 935D | 20 |
| TOTAL | 100 |

TABLE 3

Properties of the cured epoxy resins.

| Test | Ex 1 (B/A1) | Ex 2 (B/A2) | C-1 (B/A3) | C-2 (B/A4) | C-3 (B/A5) | C-4 (B/A6) | C-5 (B/A7) | C-6 (B/A8) |
|---|---|---|---|---|---|---|---|---|
| Cured density (g/cc) | 0.66 | 0.66 | 0.66 | 0.66 | 0.66 | 0.66 | 0.66 | 0.66 |
| Extrusion rate from dual Pac Cartridge (g/min) | 60 | ND | ND | 65 | 35 | NE | 35 | NE |
| Time to reach Shore D ≥ 50 (min at 23° C.) | 45 | 60 | 90 | 240 | 120 | ND | 140 | 120 (*) |
| Compression strength at 23° C. (MPa) | 55 | ND | ND | 22 | 14 | ND | 51 | ND |
| Compression strength at 80° C. (MPa) | 10 | ND | ND | ND | ND | ND | 8 | ND |
| Flammability test F1 | Pass | ND | ND | ND | ND | ND | Pass | ND |

Notes:
ND: not determined
NE: not extrudable
(*) Manually blended.

TABLE 1

Composition of the A-part.

| Ingredients (in % by weight) | A1 | A2 | A3 | A4 | A5 | A6 | A7 | A8 |
|---|---|---|---|---|---|---|---|---|
| VERSAMINE C31 | 51 | 51 | 51 | 0 | 0 | 0 | 51 | 51 |
| JEFFAMINE D230 | 0 | 0 | 0 | 51 | 0 | 0 | 0 | 0 |
| TTD | 0 | 0 | 0 | 0 | 51 | 0 | 0 | 0 |
| ANCAMID 910 | 0 | 0 | 0 | 0 | 0 | 51 | 0 | 0 |
| CALCIUM TRIFLATE | 11 | 8 | 5 | 11 | 11 | 11 | 0 | 0 |
| CALCIUM NITRATE | 0 | 0 | 0 | 0 | 0 | 0 | 11 | 13 |
| ANCAMINE K54 | 15 | 15 | 15 | 15 | 15 | 15 | 15 | 15 |
| GLASS BUBBLES D32 | 23 | 26 | 29 | 23 | 23 | 23 | 23 | 21 |
| Total | 100 | 100 | 100 | 100 | 100 | 100 | 100 | 100 |

The invention claimed is:

1. A curable honeycomb-filling composition comprising:
   a) an epoxy resin;
   b) an epoxy curing agent comprising at least one cycloaliphatic amine;
   c) at least 5.5 wt % of a metal triflate catalyst;
   d) optionally, a fatty acid polyamide; and
   e) optionally, a filler material,
wherein the curable honeycomb-filling composition provides a time to reach Shore D≥50 of less than 90 min when measured at 23° C. according to the test method described in the experimental section and further has an extrusion rate of at least 20 g/min when being extruded at a temperature of 23° C. and a pressure of 5 bar for 60 seconds through a circular aperture having a diameter of 4.0 mm, and further wherein the curable honeycomb-filling composition is free of polymeric toughening agents.

2. The curable honeycomb-filling composition of claim 1, wherein the curable honeycomb-filling composition comprises a fatty acid polyamide.

3. A curable honeycomb-filling composition according to claim 2, which comprises less than 15 wt % of a metal triflate catalyst.

4. A curable honeycomb-filling composition according to claim 2, wherein the metal triflate catalyst is selected from the group consisting of calcium triflate, magnesium triflate, lithium triflate, lanthanum triflate, and any combinations or mixtures thereof.

5. A curable honeycomb-filling composition according to claim 2, wherein the metal triflate catalyst is selected from the group consisting of calcium triflate and magnesium triflate.

6. A curable honeycomb-filling composition according to claim 2, wherein the metal triflate catalyst comprises calcium triflate.

7. A curable honeycomb-filling composition according to claim 2, wherein the cycloaliphatic amine is selected from the group consisting of 1,4-diaminocyclohexane; 4,4'-diaminodicyclohexylmethane; 1,3-diaminocyclopentane; 4,4'-diaminodicyclohexylsulfone; 4,4'-diamino-dicyclohexyl-propane-1,3; 4,4'-diamino-dicyclohexyl-propane-2,2; 3,3'-dimethyl-4,4'-diaminodicyclohexylmethane; 3-aminomethyl-3,3,5-trimethyl cyclohexyl amine; aminomethyl tricyclodecane; and any combinations or mixtures thereof.

8. A curable honeycomb-filling composition according to claim 2, which has a compression strength at 23° C. of at least 30 MPa, when measured according to the test method described in the experimental section.

9. The curable honeycomb-filling composition according to claim 8, wherein the curable honeycomb-filling composition comprises from 0.2 to 4 wt % of the fatty acid polyamide.

10. The curable honeycomb-filling composition according to claim 9, wherein the curable honeycomb-filling composition comprises from 0.2 to 2 wt % of the fatty acid polyamide.

11. A curable honeycomb-filling composition according to claim 2, which comprises:
a) from 10 to 70 wt % of an epoxy resin;
b) from 10 to 50 wt % of an epoxy curing agent comprising at least one cycloaliphatic amine;
c) from 5.53 to 8 wt % of a metal triflate catalyst;
d) from 0.1 to 5 wt % of a fatty acid polyamide that is a non-reactive fatty acid polyamide; and
e) optionally, from 1 to 50 wt % of a filler material comprising hollow particles.

12. A method of filling voids in a sandwich structure, comprising the steps of:
a) providing a curable composition according to claim 2;
b) filling at least part of the voids comprised in the sandwich structure with the curable composition; and
c) allowing the curable composition to cure.

13. A method of filling voids according to claim 12, wherein the sandwich structure comprises a honeycomb structure.

14. The curable honeycomb-filling composition according to claim 2, wherein the fatty acid polyamide has a melting point between 100° C. and 155° C., and wherein the fatty acid polyamide comprises at least two end-groups according to formula (I):

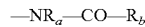

wherein $R_a$ represents H or an alkyl group having from 1 to 4 carbon atoms and $R_b$ represents a saturated or unsaturated alkyl chain containing from 3 to 27 carbon atoms.

* * * * *

UNITED STATES PATENT AND TRADEMARK OFFICE
CERTIFICATE OF CORRECTION

PATENT NO. : 10,882,947 B2  
APPLICATION NO. : 15/301126  
DATED : January 5, 2021  
INVENTOR(S) : Sohaib Elgimiabi Page 1 of 1

It is certified that error appears in the above-identified patent and that said Letters Patent is hereby corrected as shown below:

In the Specification

Column 1
Line 47, delete "cross-linking" and insert -- cross-linking. --, therefor.

Column 6
Line 38, delete "-diamino dicyclohexylmethane;" and insert -- -diaminodicyclohexylmethane; --, therefor.

Column 10
Lines 8-9, delete "rnicrobalioons" and insert -- microballoons --, therefor.
Line 17, delete "fitters" and insert -- fillers --, therefor.

Column 15
Line 37, delete "4,4'-diamino dicyclohexylsulfone;" and insert -- 4,4'-diaminodicyclohexylsulfone; --, therefor.
Lines 39-40, delete "4'-diamino dicyclohexylmethane;" and insert
-- 4'-diaminodicyclohexylmethane; --, therefor.

Signed and Sealed this  
Twenty-third Day of March, 2021

Drew Hirshfeld  
*Performing the Functions and Duties of the*  
*Under Secretary of Commerce for Intellectual Property and*  
*Director of the United States Patent and Trademark Office*